(12) United States Patent
Modlin et al.

(10) Patent No.: US 7,675,888 B2
(45) Date of Patent: Mar. 9, 2010

(54) ORTHOGONAL FREQUENCY DIVISION MULTIPLEXING ACCESS (OFDMA) RANGING

(75) Inventors: Cory S. Modlin, Chevy Chase, MD (US); Tarik Muharemovic, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 495 days.

(21) Appl. No.: 11/531,586

(22) Filed: Sep. 13, 2006

(65) Prior Publication Data
US 2007/0058524 A1     Mar. 15, 2007

Related U.S. Application Data

(60) Provisional application No. 60/717,049, filed on Sep. 14, 2005.

(51) Int. Cl.
*H04B 7/216* (2006.01)
*H04W 4/00* (2009.01)
*H04B 7/208* (2006.01)
*H04J 11/00* (2006.01)

(52) U.S. Cl. ............... 370/335; 370/332; 370/344; 370/210

(58) Field of Classification Search ........... 370/208, 370/210
See application file for complete search history.

(56) References Cited

U.S. PATENT DOCUMENTS

| | | | | |
|---|---|---|---|---|
| 6,522,987 | B1 * | 2/2003 | Flink et al. | 702/122 |
| 7,190,748 | B2 * | 3/2007 | Kim et al. | 375/345 |
| 7,313,126 | B2 * | 12/2007 | Yun et al. | 370/344 |
| 7,336,647 | B2 | 2/2008 | Muharemovic | |
| 2004/0086027 | A1 * | 5/2004 | Shattil | 375/146 |
| 2005/0135230 | A1 * | 6/2005 | Yu et al. | 370/210 |
| 2005/0141474 | A1 | 6/2005 | Lee et al. | |
| 2005/0163238 | A1 * | 7/2005 | Fujii | 375/260 |
| 2006/0098749 | A1 * | 5/2006 | Sung et al. | 375/260 |

OTHER PUBLICATIONS

Moose, Paul H.; A Technique for Orthogonal Frequency Division Multiplexing Frequency Offset Correction; IEEE Transactions on Communications, vol. 42; No. 10, Oct. 1994, pp. 2908-2914.

\* cited by examiner

*Primary Examiner*—Lester Kincaid
*Assistant Examiner*—Yu (Andy) Gu
(74) *Attorney, Agent, or Firm*—Steven A. Shaw; W. James Brady; Frederick J. Telecky, Jr.

(57) ABSTRACT

A method for Orthogonal Frequency Division Multiplexing Access (OFDMA) ranging is provided. The method includes receiving a signal having OFDMA symbols. An FFT is performed on this signal. Matching ranging codes are found. The power for a given hypothesized ranging code is determined and compared to a power threshold to determine if the code was transmitted. The timing offset and power are reported as the result of ranging.

4 Claims, 7 Drawing Sheets

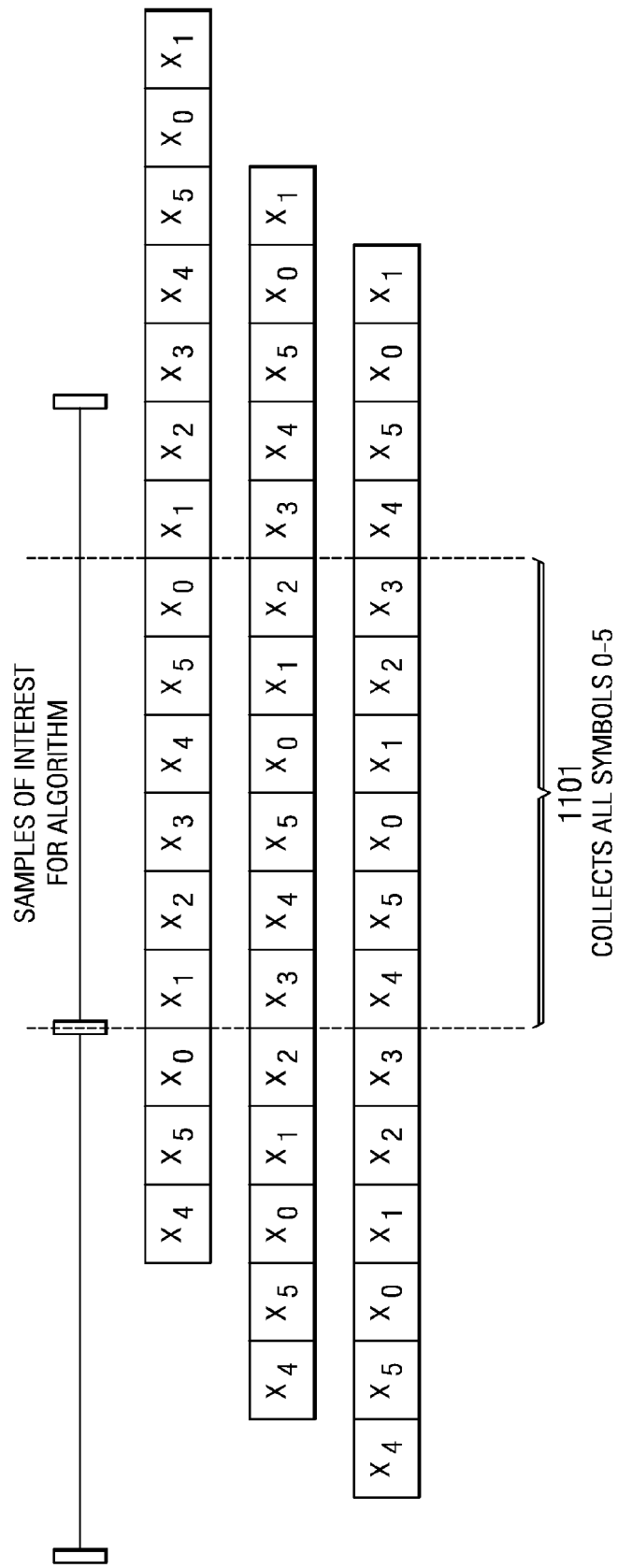

ORTHOGONAL FREQUENCY DIVISION MULTIPLEXING ACCESS (OFDMA) RANGING

CROSS-REFERENCE TO RELATED APPLICATIONS

This application claims priority to and incorporates by reference U.S. Provisional Application No. 60/717,049, filed Sep. 14, 2005, entitled "OFDMA Ranging", Cory S. Modlin inventor.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Embodiments of the invention are directed, in general, to communication systems and, more specifically, to ranging procedures for use in communication systems.

Orthogonal Frequency Division Multiplexing Access (OFDMA) defines an access scheme of a two-dimensional grid that combines Time Division Access (TDM) with Frequency Division Access (FDM). In OFDMA, data symbols are delivered on subcarriers which form subchannels. Depending on system situation, a predetermined number of subcarriers form one subchannel.

Ranging is the term used to describe the procedure for an SS (subscriber station) to join a network or to change BSs (base stations) as a result of a hand-off. Ranging can also be used to update the frequency or timing offset. However, it is expected that we will not use ranging for this purpose and instead rely on updates from channel estimation.

For application of Time Division Duplexing (TDD) to the OFDMA communication system, ranging is required to acquire accurate timing synchronization between the SS and the BS and adjust the reception power of the BS on the uplink. In each OFDMA frame a ranging channel has a plurality of subchannels for transmitting a ranging signal.

The initial ranging is the process of acquiring a correct timing offset between the BS and the SS and initially adjusting a transmit power. Upon power-on, the SS acquires downlink synchronization from a received downlink preamble signal. Then the SS performs the initial ranging with the BS to adjust an uplink time offset and transmit power. The IEEE 802.16d/e communication systems use the OFDM/OFDMA communication scheme. Thus, they perform a ranging procedure by transmitting a randomly selected ranging code on a plurality of subchannels.

The periodic ranging is the process of periodically tracking the uplink timing offset and received signal strength after the initial ranging. The SS randomly selects one of ranging codes allocated for the periodic ranging in the ranging procedure.

SUMMARY

A method for Orthogonal Frequency Division Multiplexing Access (OFDMA) ranging is provided. The method includes receiving a signal having OFDMA symbols. An FFT is performed on this signal. Matching ranging codes are found. The power for a given hypothesized ranging code is determined and compared to a power threshold to determine if the code was transmitted. The timing offset and power are reported as the result of ranging.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

FIG. 11A shows samples of interest for flowchart of FIG. 11B.

DETAILED DESCRIPTION

Figure 1:
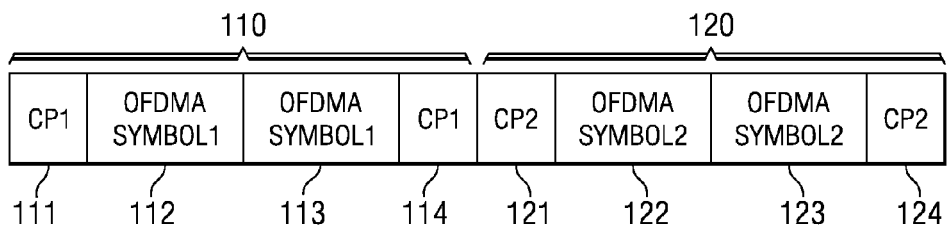
FIG. 1 is a diagram illustrative of initial ranging slot, which may be either 2 or 4 OFDMA symbols set by the BS in UL_MAP.

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein, but may be modified within the scope of the appended claims along with their full scope of equivalents.

In summary, embodiments of the invention use the following principles:
  we use the FFT results from the normal FFT time slots and we do not calculate additional FFT results;
  if we find that the performance is not sufficient and we have cycles to spare;
  performance can be improved by using sliding window FFT; and
  we assume we will have multiple passes at initial ranging because the estimates made at very low SNRs are not as reliable as those made at higher SNRs.

Ranging is part of the overall initialization. Initialization steps are described in section (6.3.9) of the Institute of Electrical and Electronics Engineers (IEEE) Standard 802.16-2004 "Part 16: Air Interface for Fixed Broadband Wireless Access Systems," October 2004 and IEEE Standard 802.16e "Part 16: Air Interface for Fixed and Mobile Broadband Wireless Access Systems Amendment for Physical and Medium Access Control Layers for Combined Fixed and Mobile Operation in Licensed Bands," D9, June 2005. Both standards incorporated herein by reference.

The initialization steps include:
  MS scans for radio channel.
  MS listens to frame structure, identifies cyclic prefix length, does timing recovery and synchronizes to the BS clock (in both TDD and FDD formats).
    standard requires MS be within 2% of BS frequency.
  MS obtains time/frequency when it can transmit a ranging request from UCD/UL_MAP messages.
  MS performs ranging (Section 6.3.9.5.1 for OFDMA) and (Section 6.3.10.3.1).
    1. MS sends CDMA code at reduced power level.
      a. MS randomly selects a ranging slot within its back-off window (specified in UCD).
      b. MS randomly selects the CDMA code within a set of allowed codes (as specified in UCD).
    2. if no response from the BS, keep increasing the power level at next random contention slot.
    3. BS sends RNG-RSP and a CDMA allocation IE in the UL_MAP (UIUC=14) to indicate it successfully received CDMA code and BS allocates slot for periodic ranging.
      a. BS does not know which MS sent the CDMA code, so it sends a broadcast message with the CDMA code and the OFDMA slot and the MS uses this to identify itself.
      b. if broadcast RNG-RSP message in CDMA allocation IE has status continue, the MS continues to send CDMA codes as it did initially with updates to timing/power as specified in the RNG-RSP message but in a periodic ranging region.
    4. BS sends RNG-RSP with status success and allocates bandwidth for specific MS.
    5. MS sends RNG-REQ message(s) in its allocated time/frequency slot after receiving a RNG-RSP with a success status and a bandwidth allocation from the BS in UL_MAP.
  negotiate basic capabilities (SBC-REQ/RSP) (Sections 11.8.1/11.8.3).
    a. FDD/TDD.
    b. max transmit power.
    c. FFT size (128, 512, 1024, 2048).
    d. HARQ (Chase or IR).
    e. BTC, STC, LDPC.
    f. AAS diversity zone.
    g. optional permutations.
  authorization and security key exchange.
  registration using REG-REQ/RSP (Section 11.7).
    a. IP version.
    b. ARQ.
    c. MAC CRC.
    d. . . .
  Step 1 of Ranging (Section 8.4.7)

"MS Sends CDMA Code"

The UL_MAP specifies one or more groups of 6 (or optionally 8) adjacent subchannels on which the contention-based ranging is done. Contention-based means that more than one MS could transmit using the same subchannels at the same time. The UL_MAP also specifies the number of OFDMA symbols on which to transmit the ranging sequence.

During ranging, MSs randomly select a ranging slot in which to send a random pseudo-random bit sequence (PRBS) BPSK code. MSs that have randomly selected the same ranging slot will be in contention—transmitting at the same time and in the same subcarriers. Because they select ranging codes at random, more than likely, the PRBS will be different for different MSs.

Through ranging, the BS can determine:
  the symbol timing offset caused by transmission delays;
  the frequency offset between the BS and MS caused by Doppler shift or by inaccuracies in the local oscillator;
  whether or not a specific PRBS code is present;
  the received power; and
  the noise variance.

Using this information, the BS can send corrections back to the MS and the MS can continue ranging until the power, timing, and frequency is aligned. If two MSs happen to send the same code at the same time in the same subchannels, the algorithm presented here will probably detect the code and report a corrupted timing offset. If this happens, both MSs will think the BS successfully heard them and both MSs will adjust their power and timing and transmit again. There is a danger that the MS power will then be too high or the timing offset too early so that the subsequent MS transmission corrupts other MS transmissions. An MS that does not receive a response to ranging transmission that comes in response to a BS ranging response should abort and start over.

Format of Initial Ranging Transmission: Time Domain

For initial ranging or handoff, either 2 or 4 OFDMA symbols are allocated for one ranging slot. The ranging Orthogonal Frequency Division Multiplexing Access OFDMA symbols are of the form shown in FIG. 1, which is a diagram illustrative of initial ranging slot, which may be either 2 or 4 OFDMA symbols set by the BS in UL_MAP. In FIG. 1, there are two sets of symbols 110 and 120, "CP1" 111 and 114 is the cyclic prefix for the first OFDMA symbol 112 and 113 using PRBS code n and "OFDMA symbol1" is the Nfft point output of the IFFT for PRBS code n. The second set of symbols 120, are optional and represent the output for PRBS code n+1. Because of the way the symbols are put together, there is no phase discontinuity between the two symbols carrying the same PRBS code.

Format of Periodic Ranging Transmission: Time Domain

Figure 2:
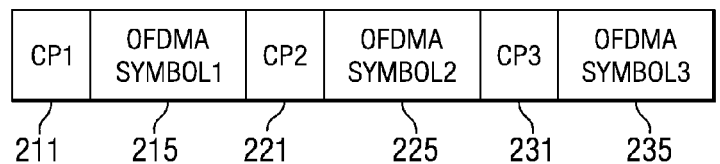
FIG. 2 is a diagram illustrative of periodic ranging showing three OFDMA symbols with respective cyclic prefixes.

In addition to the initial ranging region, a periodic ranging region is also defined. Unlike the initial ranging region, the cyclic prefix is appended as usual during periodic ranging. Therefore, to use the periodic ranging region, the MS must already be aligned in time. Misalignment will cause distortion not only in the ranging subchannels, but also for other users. FIG. 2 shows three OFDMA symbols 215, 225, and 235 with respective cyclic prefixes 211, 221, and 231.

The idea is that after timing and power adjustments, the MS would switch to the periodic ranging region for fine adjustments and to allow a better estimate of the SNR by the BS.

Format of Ranging Transmission: Frequency Domain

A subchannel contains groups of tiles—each tile has 4 adjacent subcarriers over 3 OFDMA symbols. For the optional Partially Used Subchannelization (PUSC) permutation, a tile contains 3 adjacent subcarriers over 3 OFDMA symbols. For the AAC permutation, a bin (like part of a tile)

contains 9 adjacent subcarriers over a variable number of OFMDA symbols (1, 2, 3, or 6).

A Pseudo-Random Binary Sequence (PRBS) is defined as:

$$x^{15} + x^7 + x^4 + x^1 + 1 \qquad (5)$$

with $c_k$ defined as the output. The PRBS is initialized to the value: 0,0,1,0,1,0,1,1,s0,s1,s2,s3,s4,s5,s6 where s6 is the LSB of the PRBS seed and s6:s0=UL_PermBase (sent in UCD).

A Code Division Multiple Access (CDMA) code is a series of 144 bits out of the PRBS. Code 0 is bits 0:143, code 1 is bits 144:287, code n is bits 144·n: 144·(n+1)−1. The MS should select a code randomly from the set of available codes as prescribed in the UCD message. Each subcarrier is modulated with $X_k$=+1 or −1 depending on the 0 or 1 output of the PRBS.

A ranging channel for the mandatory Partially Used Sub-channelization (PUSC) contains at least one group of 6 sub-channels, each subchannel has 6 tiles of 4 subcarriers each for a total of 144 subcarriers (6*6*4=144). I assume that if more than one group of 6 subchannels is used, the PRBS sequence is repeated—not extended. For the optional PUSC, there are 8 tiles with 3 subcarriers each and 6 tiles per subchannel—again there are 144 subcarriers (8*3*6=144). For the AAC permutation, there are 9 subcarriers per bin, 8 subchannels per ranging group, and 1, 2, 3, or 6 bins per OFDMA symbol for 72, 144, 216, or 432 bits.

The receiver detects the code by correlating the received sequence with each of the possible ranging codes. Therefore, the more codes there are, the smaller the chance of a collision but the higher the processing requirements.

Detection of the Code, Power, Delay, and Frequency Offset

A BPSK (+/−1) symbol modulates each of the subcarriers in the ranging slot. The BPSK sequence is selected from a PRBS seeded to match a certain ranging code as we mentioned earlier. Assuming the BPSK sequence is denoted by $X_k$ for OFDM tone k and the channel is denoted as $H_k$, the channel output at time n can be written as $$y_n = \frac{1}{N}\left[\sum_{k=-N/2}^{N/2-1} X_k H_k e^{2\pi j n(k+\varepsilon)/N}\right] + w_n \qquad (1)$$

where $\epsilon$ is the frequency offset expressed as a fraction of the tone spacing ($\Delta f \cdot N/F_s$), $W_n$ is assumed here as additive white complex Gaussian noise, N is the IFFT size (number of complex samples—up to 2048 in OFDMA), $\Delta f$ is the frequency offset in Hz, and $F_s$ is the sampling frequency in Hz. Here we assume the MS has locked to the BS clock. $X_k$ is the value of the PRBS code and can take on the values +1 and −1.

When the cyclic prefix is sufficiently long to cover the channel delay or, as in the case of ranging, when the symbol is continuous with no phase discontinuity, the output of the DFT at the receiver (FFT) can be written as:

$$Y_k = X_k H_k \frac{\sin \pi \varepsilon}{N \times \sin(\pi \varepsilon / N)} e^{j\pi\varepsilon(N-1)/N} \cdot e^{-j2\pi \cdot I \cdot k/N} + I_k + W_k \qquad (2)$$

where I is the OFDM symbol timing offset in samples, $I_k$ is the interchannel interference caused by the frequency offset from subcarriers other than subcarrier k, and $W_k$ is the noise term.

$$I_k \sum_{\substack{m=-N/2 \\ m \neq k}}^{N/2-1} X_m H_m \frac{\sin \pi \varepsilon}{N \sin(\pi[m-k+\varepsilon]/N)} e^{j\pi\varepsilon(N-1)/N} e^{-j\pi(m-k)/N} e^{-j2\pi \cdot I \cdot k/N} \qquad (3)$$

For example, at 125 km/hr and 3.5 GHz, the ICI is about 24 dB below the signal level on each subcarrier (using a Doppler shift of 405 Hz and a subcarrier spacing of 11.2 kHz). For the same conditions, the ICI is 27 dB below the signal for the wider 15.6 kHz tone spacing.

We can discern one user from another by using the CDMA code. For all possible ranging codes (the BS decides on the number of possible codes to use for initial and periodic ranging), we multiply the received signal, $Y_k$, by the ranging code and find $Z_k = Y_k \times \hat{X}_k$ where $\hat{X}_k$ is one of the ranging codes. If we have selected a code that was transmitted, $X_k \times \hat{X}_k$ will always equal 1 because $X_k$ is either +1 or −1 and we assume $X_k = \hat{X}_k$.

For a matching CDMA code, we can find the symbol offset, I, by calculating $$Z_k Z_{k+1}^* = H_k H_{k+1}^* \frac{\sin^2 \pi \varepsilon}{[N \times \sin(\pi \varepsilon / N)]^2} e^{j2\pi \cdot I/N} + \text{noise terms} \qquad (4)$$

The $\sin^2$ term will be very close to 1 for Doppler shifts we are considering (−0.02 dB for the 405 Hz Dopper/11.2 kHz tone spacing example).

The noise terms can be written, ignoring the $\sin^2$ and phase terms, $$\text{noise terms} \approx W_k H_{k+1}^* + H_k W_{k+1}^* + W_k I_{k+1}^* + I_k W_{k+1}^* + H_k I_{k+1}^* + I_k H_{k+1}^* + I_k I_{k+1}^* + W_k W_{k+1}^* \qquad (5)$$

We expect no correlation between the channel, H, and the additive noise, W, Also, the ICI terms, I, are well below the signal term. However, there could be correlation between $W_k$ and $W_{k+1}$ depending on the noise environment. But it is unlikely that this correlation would persist over many tiles.

If we assume the channel changes very little from subcarrier k to k+1 and we assume that the noise is well below the signal, the symbol timing offset is the phase of $Z_k \cdot Z^*_{k+1}$ 1 as seen in equation (4).

Figure 3:
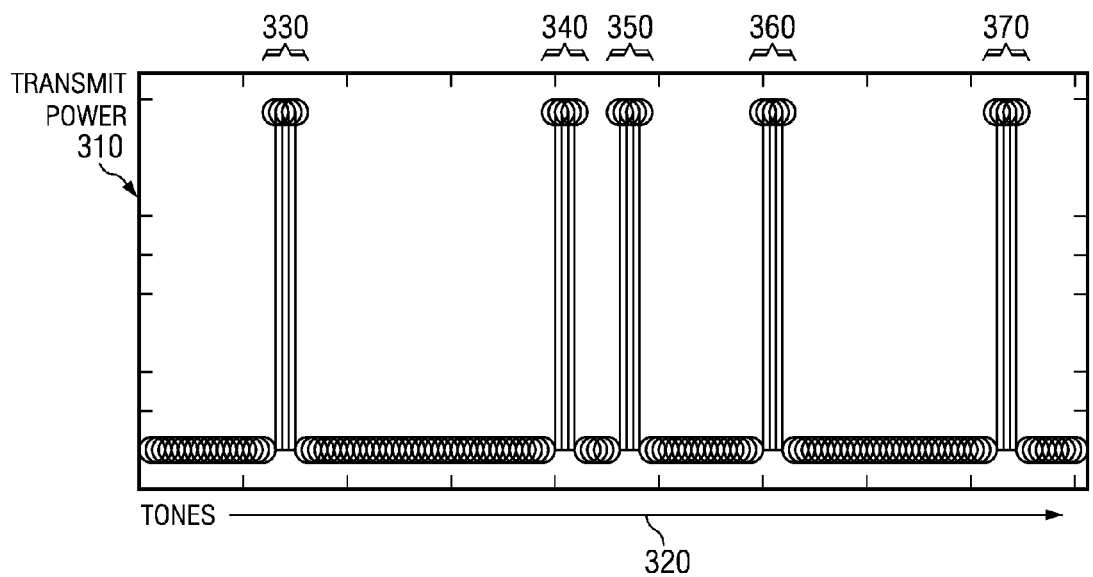
FIG. 3 shows mandatory PUSC tile configuration.

Turning now to FIG. 3 which is a diagram showing mandatory PUSC tile configuration. If a tile contains subcarriers t0 through t0+3, as shown in FIG. 3, we form the sum $$Z_{t0} Z_{t0+1}^* + Z_{t0+1} Z_{t0+2}^* + Z_{t0+2} Z_{t0+3}^*$$

for each tile and repeat the sum for all tiles. This can be written as $$ZZ^* \text{ sum} = \frac{1}{M} \sum_{i=0}^{L-1} \left[ \sum_{n=0}^{N-2} Z_{ti+n} Z_{ti+n-1}^* \right] \qquad (6)$$

where i is tile number index, L is number of tiles, ti denotes the first subcarrier of tile i, n is subcarrier index, N is number of subcarriers per tile and M=L*N−1). Each term in the sum is the multiplication of the "Z" term on a given subcarrier with the complex conjugate of the "Z" term on the adjacent subcarrier where "*" means complex conjugate.

From equation (4), we see that the phase of the ZZ* sum yields an estimate of the timing offset. Similarly, the magnitude of ZZ* sum gives an estimate of the transmit power and can be used to detect whether or not the code is present.

If other users are in contention but are using different codes or we have hypothesized the wrong code, the signal part of the sum of $Z_k \cdot Z^*_{k+1}$ will average to near zero if the codes are truly orthogonal. In practice, however, the codes are not orthogonal as we discuss later in this document. The ICI and noise terms will fall below the signal term as we average over more terms.

To get a feel for the performance of the signal and noise estimates using the sum in equation (6), we consider the case where there is only additive Gaussian noise. In this case, $$ZZ^*\text{sum\_just\_noise} = \frac{1}{M} \sum_{i=\#\,tiles} \left[ \sum_{n=0:\,nsubcarriersPerTile-1} W_{ti+n} W^*_{ti+n+1} \right] \quad (7)$$

because all other terms in equations (4) and (5) are zero when there is only noise. If we assume there are enough terms in the sum in equation (7) so that the central limit theorem applies, the distribution of the absolute value of ZZ*sum_just_noise is approximately Rayleigh. If we let the power of the additive complex Gaussian noise be $\sigma^2$, then the expected value of the absolute value of ZZ*sum_just_noise is approximately:

$$\overline{|ZZ^*\text{sum\_just\_noise}|} = \frac{\sigma^2}{\sqrt{2}} \sqrt{\frac{\pi}{2}} \frac{1}{\sqrt{M}}$$

which means that the noise level of the sum is reduced from the actual noise level by $$\frac{\sqrt{\pi}}{2\sqrt{M}}.$$

TABLE 1

Average power of the additive noise term in ZZ*sum relative to the AWGN noise power. M = 108, 90, and 36 corresponds to 6, 5, and 2 subchannels per ranging slot respectively with four subcarriers per tile.

| M | noise estimate from taking the absolute value of ZZ*sum_just_noise relative to actual noise power level |
|---|---|
| 108 | −10.7 dB |
| 90 | −10.3 dB |
| 36 | −8.3 dB |

Unfortunately, because the mean of the absolute value of ZZ*sum_just_noise is approximately Rayleigh, the values can vary widely. The cumulative distribution function of a Rayleigh random variable generated from a complex Gaussian random variable with variance $\sigma^2$ is:

$$F_R(r) = 1 - e^{-r^2/N2\sigma^2} \text{ for } r \geq 0.$$

From this, we can calculate the probability that the measured noise exceeds the actual noise by a given amount. Irrespective of M and $\sigma 2$, the probability that the measured noise exceeds the mean level, as measured in ZZ*sum_just_noise, by more than 4.9 dB is 1/1000 and by more than 4.1 dB is 1/100. Simulation shows that this result holds for M as low as 36.

The conclusion is that if we use |ZZ*sum| as the estimate of the signal power, the average measured noise power will be below the actual noise power by the values listed in Table 1 (about 8-10 dB). With a 1/1000 chance, the measured noise will not exceed this by more than 4.9 dB. For M=108, assuming we know the noise power, if we see a symbol with a measured power higher than 10.7-4.9 dB below the noise power, there is a 999/1000 chance that this symbol contained a ranging code and if we use this as the threshold, there is a 1/1000 chance of a false detect. We will discuss how we measure the noise power later.

Multiple Antennas

Multiple receive antennas can be used to improve the performance of ranging. One simple way to take advantage of multiple antennas is to extend equation (6) over all receive antennas $$ZZ^*\text{sum} = \frac{1}{M} \sum_{a=0}^{A-1} \sum_{i=0}^{L-1} \left[ \sum_{n=0}^{N-2} Z^a_{ti+n} Z^{*a}_{ti+n+1} \right] \quad (8)$$

where a denotes the antenna number, A is number of antennas, i is tile number index, L is number of tiles, ti denotes the first subcarrier of tile i, n is subcarrier index, N is number of subcarriers per tile[13] and M is now

M=A*L*(N−1).

If the noise from antennas is independent, the performance will improve. The noise reduction is proportional to the sqrt (M) as we described earlier. Each term in the sum is the multiplication of the "Z" term on a given subcarrier with the complex conjugate of the "Z" term on the adjacent subcarrier where "*" means complex conjugate.

Code Correlation

Using contention-based ranging, we correlate the received signal with each of the possible ranging codes. If there is correlation among codes, the power we detect for unused codes can be well above the noise level.

We ran a simple simulation assuming that there are 16 possible ranging codes in a ranging domain. We looked over all 255 possible domains (selection of UL_PermBase). For any two codes, we summed up the dot product of the codes. Perfect correlation would yield a sum of 144. Perfect orthogonality would yield a sum of 0. The actual correlation is equal to the sum divided by 144.

Figure 5:
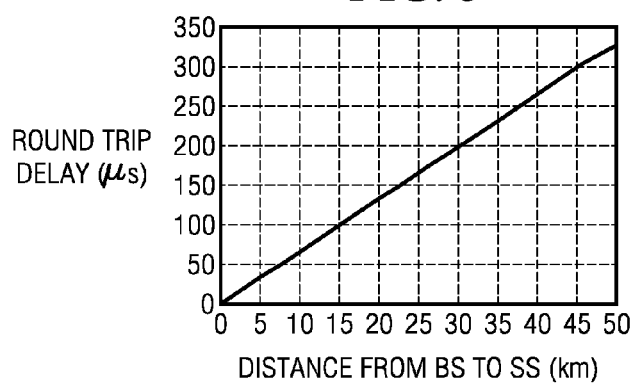
FIG. 5 shows the round-trip delay as a function of distance to the BS.

Referring now to FIG. 5, which is a graph showing the maximum correlation between ranging codes over 16 consecutive ranging codes. As we see in FIG. 5, the codes do not have very good cross-correlation properties. Depending on the selection of UL_PermBase, with 16 adjacent codes, the correlation is between −5 and −7.5 dB.

This result assumes a flat channel. With a shaped channel, the correlation will change depending on how the correlation between codes corresponds with the highs and lows of the channel magnitude.

The correlation limits the number of users who can be detected simultaneously. Signals from different users will be received at different powers.

Code Detection

In this section, we discuss the process of detecting whether or not a specific ranging code is present.

The first step is to establish a reference. We propose allocating a region that is one OFDMA symbol long and one ranging group in frequency in which no MS is allowed to transmit. In this region, we can measure the power level over the ranging subchannels and the result should be the noise level. This region need not be allocated every frame and so the bandwidth reduction will be extremely small.

If there are M complex subcarriers used to measure the overall noise power, we can calculate the variance of the noise estimate. It is equal to $$\text{variance of noise estimate} = \sigma^2 \sqrt{\frac{1}{M}}.$$

Then assuming the estimate itself is Gaussian, we can use the Gaussian error function to calculate the probability that the noise estimate exceeds the actual noise level. We found that the probability that the estimated noise level exceeds the true noise power by 1 dB for 144 subcarriers is about 1/1000. We therefore use +/−1 dB as our confidence interval. If we average over multiple regions, the estimate will become more accurate.

For each of the possible ranging codes in the initial ranging domain, we estimate the power in every OFDMA symbol using the absolute value of ZZ*sum as we described earlier. For each ranging code, n, we find the symbol with the highest power, maxpwr(n). We say that a ranging code may be present if maxpwr(n)>estimated noise level+1 dB+4.9 dB where 4.9 dB is the level at which there is a 1/1000 chance that the absolute value of ZZ*sum will exceed when no ranging code is present—the 4.9 dB was derived above.

Figure 4:
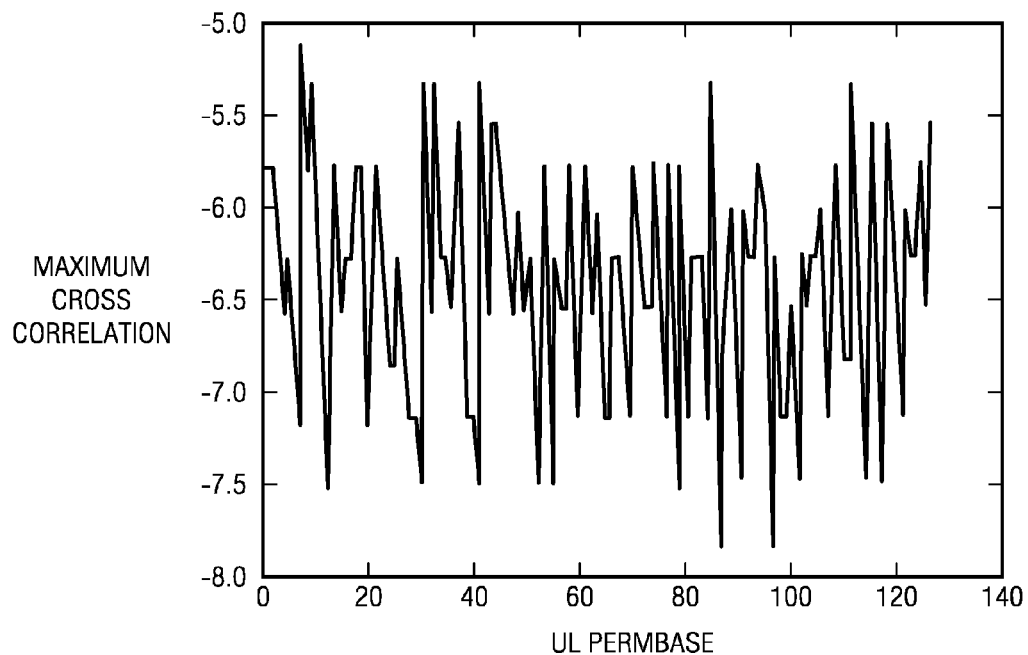
FIG. 4 is a graph showing the maximum correlation between ranging codes over 16 consecutive ranging codes.

Simply measuring a signal level greater than then noise does indicate that some ranging code is present, but it does not necessarily mean that the specific ranging code, n, is present. The reason is the inter-code correlation as we discussed earlier. As we showed in FIG. 4, the inter-code correlation varies depending on UL_PermBase but is in the −7.5 dB to −5 dB range for a flat channel and could be different (worse or better) depending on the shape of the channel.

If we knew the cross correlation between all P ranging codes, r(ni, nj), we could calculate the received power of each code independently.

$$\begin{bmatrix} maxpwr(0) \\ maxpwr(1) \\ \vdots \\ maxpwr(P-1) \end{bmatrix} =$$

$$\begin{bmatrix} 1 & r(n0, n1) & \cdots & r(n0, n(P-1)) \\ & 1 & & \\ \vdots & & \ddots & r(n(P-2), n(P-1)) \\ r(n(P-1), n0) & \cdots & r(n(P-1), n(P-2)) & 1 \end{bmatrix}$$

$$\begin{bmatrix} actpwr(0) \\ actpwr(1) \\ \vdots \\ actpwr(P-1) \end{bmatrix}$$

$$maxpwr = R \cdot actpwr$$

The cross correlation matrix, R, is symmetric. The actual power can then be calculated as:

$$actpwr = R^{-1} \, maxpwr. \tag{9}$$

Unfortunately, however, we don't know the cross correlation matrix. But we can calculate the worst case correlation assuming a flat channel and assume r(ni, nj)=worst case correlation for all values. The matrix inverse can then be calculated off-line and we can approximate the actual power this way.

We calculate the actual powers in this way and determine that a specific code is present if the actual power is within 4.5 dB of the highest actual power (the number 4.5 will likely need tweaking).

To calculate the frequency offset, we use the results of successive FFTs. Only one MS can transmit at a time to estimate the frequency offset. The time domain signal due to a single input subcarrier, i, is (similar to equation (1) but for only one subcarrier, i)

$$y_{i,n} = \frac{1}{N}[X_i H_i e^{j2\pi \cdot n(i+\varepsilon)/N}] + w_n \tag{10}$$

and the corresponding frequency domain FFT output, on tone k due to an input on subcarrier i with a time delay, l, is, using the definition of the DFT, $$Y_{i,k} = \frac{1}{N} \sum_n X_i H_i e^{j2\pi \cdot (n-l) \cdot (i+\varepsilon)/N} e^{-j2\pi \cdot nk/N} + W_k \tag{11}$$

and the overall DFT, $Y_k$, is the sum of $Y_{i,k}$ over all i. As pointed out in "*A Technique for Orthogonal Frequency Division Multiplexing Frequency Offset Correction*" by Paul H. Moose; IEEE TRANSACTIONS ON COMMUNICATIONS, VOL. 42. NO. 10; OCTOBER 1194, $Y_{k,k}$ is dominant over the $Y_{k,i}$ terms for i≠k as intuition would suggest. With no frequency offset, the signal part of $Y_{k,i}$=0 for i≠k.

If we take the DFT of $y_{i,n+N+m}$, where N+m is the offset of one FFT relative to the next, the result, $U_{i,k}$, is $$U_{i,k} = \frac{1}{N} \sum_n X_i H_i e^{j2\pi \cdot (n-l+N+m)(i+\varepsilon)/N} e^{-j2\pi \cdot nk/N} + W_k \tag{12}$$

$$= \frac{1}{N} e^{j2\pi \cdot (N+m)\varepsilon/N} \cdot e^{j2\pi \cdot m \cdot i/N} Y_{i,k}$$

and then $U_k$ is the sum of $U_{k,i}$ over all subcarriers, i:

$$U_k = \sum_i \frac{1}{N} e^{j2\pi \cdot (N+m)\varepsilon/N} \cdot e^{j2\pi \cdot m \cdot i/N} Y_{i,k} \tag{13}$$

To estimate the frequency offset, we use a similar technique to the one we used to detect the symbol offset. We define $T_k = U_k \times \hat{X}_k$ where $\hat{X}_k$ is one of the hypothesized ranging codes, then $$Z_{k,k}T_{k,k}^* = H_k e^{-j2\pi \cdot l \cdot k/N} H_k^* e^{-j2\pi \cdot (N+m)\varepsilon/N} e^{-j2\pi \cdot m \cdot k/N} e^{j2\pi \cdot l \cdot k/N} + \ldots \quad (14)$$

$$= H_k H_k^* e^{-j2\pi \cdot (N+m)\varepsilon/N} e^{-j2\pi \cdot m \cdot k/N} + \ldots$$

and then the angle of the sum is $-(1+m/N)\varepsilon - mk/N$ from which we an estimate the frequency offset, $\varepsilon$.

This technique can only be used when there is no contention. With contention, there is no way to discriminate between users.

Timing Offset

Ranging Region and Cell Radius

Figure 9:
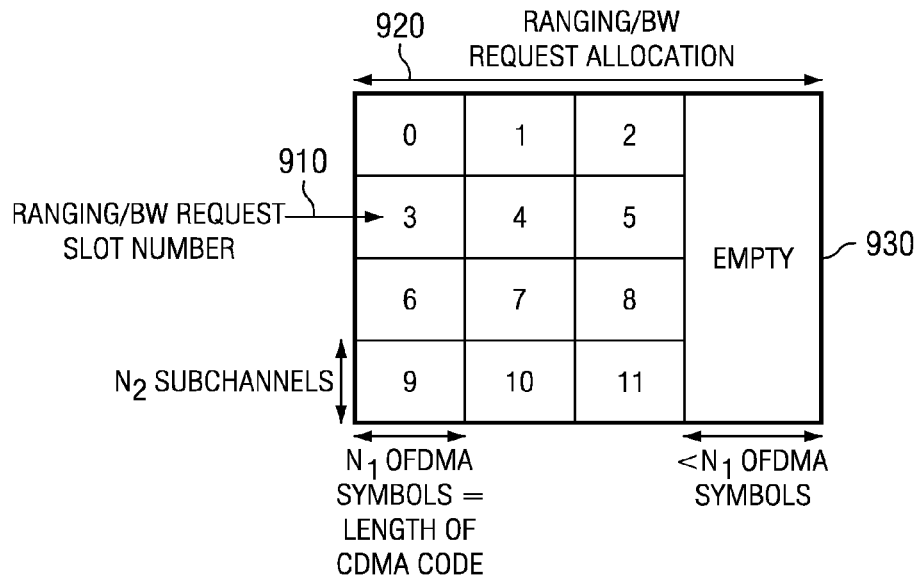
FIG. 9 is a presentation of FIG. 243a from IEEE publication 802.16-2004 corr. "Corrigendum to IEEE Standard for Local and Metropolitan Area Networks—Part 16: Air Interface for Fixed Broadband Wireless Access Systems," Corr1/D3, May 2005.

Turning now to FIG. 9, which is FIG. 243a of IEEE publication 802.16-2004 corr. "Corrigendum to IEEE Standard for Local and Metropolitan Area Networks—Part 16: Air Interface for Fixed Broadband Wireless Access Systems," Corr1/D3, May 2005; incorporated herein by reference teaches that a series of ranging slots can be concatenated to form a ranging allocation. The allocation 920 spans both frequency and time. In frequency, each ranging slot occupies one or more subchannels so multiple ranging slots can occupy the same OFDMA symbol by using more subchannels. Similarly, in time, a ranging slot occupies 1, 2, 3, or 4 OFDMA symbols (2 or 4 for initial ranging, 1 or 3 for periodic ranging) and multiple slots can be concatenated in time. In the figure, each number (0-11) represents one ranging slot 910.

The total number of OFDMA symbols for the ranging allocation 920 is specified in the UL_MAP_IE. This number can be greater than the number of symbols used by the ranging slots. This empty time is shown in FIG. 9 as 930. The empty time is required during initial ranging to prevent a delayed transmission from colliding with data transmissions from other MSs.

The number of empty symbols is related to the round-trip delay and the cell radius. Initially, the MS listens to the frame structure and should transmit so as to be co-located with the BS. Practically, this means that the MS transmission can be anywhere from perfectly aligned (if the MS and BS are actually right next to each other) to delayed by an amount equal to the round-trip delay at the edge of the cell. The round-trip delay is calculated as:

round trip delay(μs)=distance(km)/$c \times 10^9$ where $c=3 \times 10^8$ m/s (speed of light). FIG. 5 shows the round-trip delay as a function of distance to the BS.

The concatenation of ranging slots places limits on the maximum supported cell radius. If, for example, two symbol initial ranging slots are used and slots are concatenated in time, there is no way to differentiate between a ranging transmission delayed by more than 2 symbols and a ranging transmission in the next slot delayed by less than 1 symbol. This is illustrated in FIG. 6.

One way to address this problem is for the MS to recognize its CDMA code in slots beyond which it transmitted—for example, if the MS sends code X in slot Y and the BS detects code X in slot Y+1, then the MS should be smart enough to recognize that code X in slot Y+1 means code X in slot Y with an additional 2 symbol delay. It would be possible to exceed a two symbol delay if N1 in FIG. 9 were set to 2 and the total ranging allocation were 5 (or more) symbols. But this would prevent us from concatenating more than one ranging slot in time.

Figure 6:
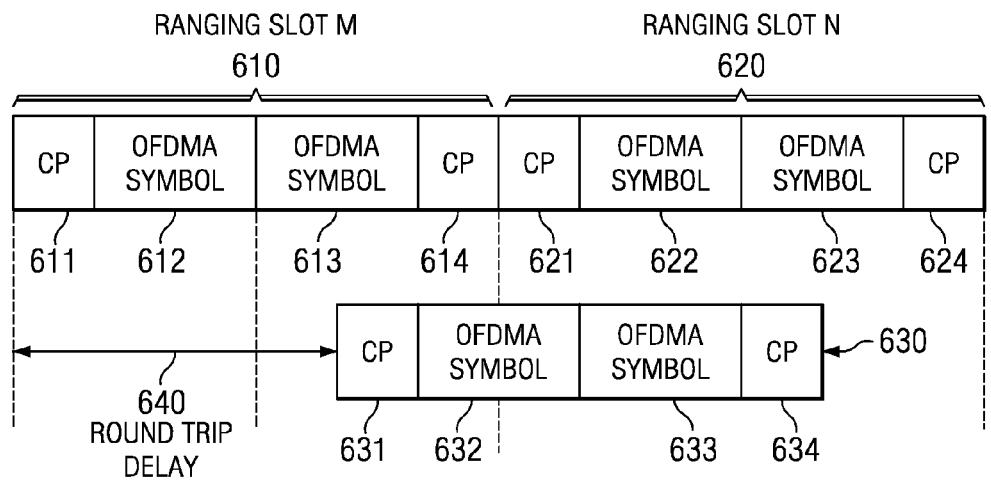
FIG. 6 is illustrative of a two slot ranging allocation which share the same subchannel(s) with the received signal.

FIG. 6 is illustrative of a two slot ranging allocation which share the same subchannel(s) with the received signal 630. If the round-trip delay is equal to two full symbols, there would be no way to know if it was slot m with a two symbol delay or slot n with no delay.

The number of OFDMA symbols we need to allocate for ranging is 2+ceiling(round trip delay/symbol duration). Otherwise, the ranging transmission will collide with data from another MS in a future OFDMA symbol. The collision could cause distortion in all subcarriers, not just the ranging subcarriers.

Estimating the Timing Offset

Our proposal is to keep the FFT time slots in their normal locations in time. Using a sliding window FFT approach will not work because distortion from other users will impede code detection.

Figure 7:
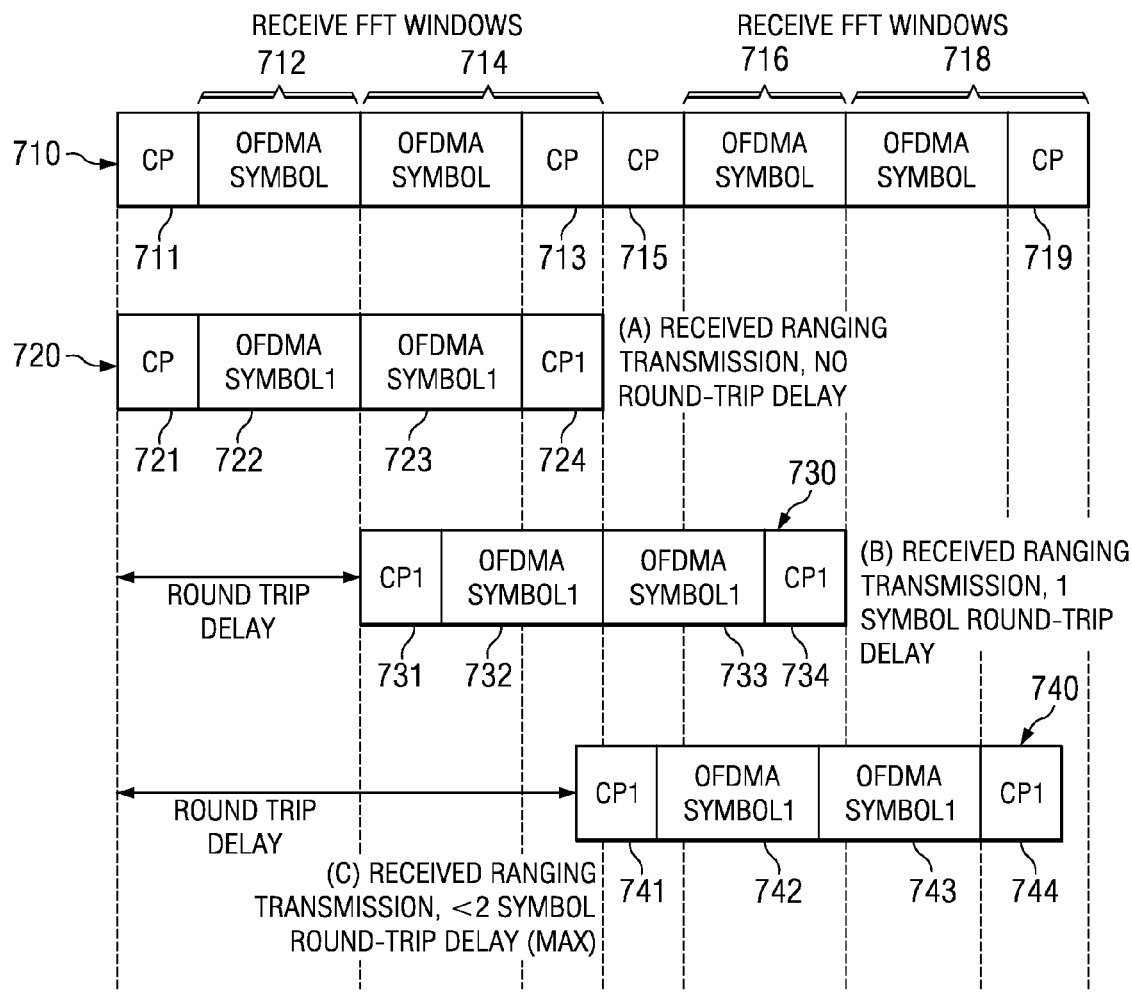
FIG. 7 is illustrative of two symbol ranging.

In each OFDMA symbol used for ranging, we get a power and timing offset estimate using equation (6). From this, we need to figure out where the received ranging signal actually falls. In FIG. 7, we look at an example of 2-symbol initial ranging. There are four possible FFT time slots for the 2-symbol signal due to the round-trip delay.

Table 2 lists the delay that will be reported (assuming no noise or distortion) as well as the attenuation of the measured signal power for 2-symbol initial ranging. In reporting the attenuation, we assume that if an OFDMA symbol is received that only overlaps the FFT time slot for x % of the time, the power attenuation is $10*\log 10(x/100)$. This is only an approximation—there will be additional attenuation because of the distorted ranging code correlation. When the OFDMA symbol does not fully overlap the FFT slot, there will be distortion in the delay estimate.

The delay of the two symbols can be derived by examining the power and delay results from all four FFT slots. FIG. 7 is illustrative of two symbol ranging. Brackets 712, 714, 716, and 718 show reference FFT locations at the receiver. 720, 730 and 740 show possible ways ranging slots can be received.

TABLE 2

For each of the four FFT time slots, this table shows the (ideal) reported delay and the average attenuation of the signal component due to misalignment within that slot. This is for an FFT size of 2048 and cyclic prefix of 256 (⅛). In general, ranging needs to work for all FFT size and CP combinations.

| | slot 0 | | slot 1 | | slot 2 | | slot 3 | |
|---|---|---|---|---|---|---|---|---|
| actual RT delay | reported delay | attenuation dB | reported delay | attenuation dB | reported delay | attenuation dB | reported delay | attenuation dB |
| 0 | 0 | 0.00 | 1792 | 0.00 | 1536 | X | 1280 | X |
| 256 | 256 | 0.00 | 0 | 0.00 | 1792 | X | 1536 | X |

TABLE 2-continued

For each of the four FFT time slots, this table shows the (ideal) reported delay and the average attenuation of the signal component due to misalignment within that slot. This is for an FFT size of 2048 and cyclic prefix of 256 (⅛). In general, ranging needs to work for all FFT size and CP combinations.

| actual RT delay | slot 0 | | slot 1 | | slot 2 | | slot 3 | |
|---|---|---|---|---|---|---|---|---|
| | reported delay | attenuation dB | reported delay | attenuation dB | reported delay | attenuation dB | reported delay | attenuation dB |
| 512 | 512 | −0.58 | 256 | 0.00 | 0 | −9.03 | 1792 | X |
| 768 | 768 | −1.25 | 512 | 0.00 | 256 | −6.02 | 0 | X |
| 1024 | 1024 | −2.04 | 768 | 0.00 | 512 | −4.26 | 256 | X |
| 1280 | 1280 | −3.01 | 1024 | 0.00 | 768 | −3.01 | 512 | X |
| 1536 | 1536 | −4.26 | 1280 | 0.00 | 1024 | −2.04 | 768 | X |
| 1792 | 1792 | −6.02 | 1536 | 0.00 | 1280 | −1.25 | 1024 | X |
| 2048 | 0 | −9.03 | 1792 | 0.00 | 1536 | −0.58 | 1280 | X |
| 2304 | 256 | X | 0 | 0.00 | 1792 | 0.00 | 1536 | X |
| 2560 | 512 | X | 256 | −0.58 | 0 | 0.00 | 1792 | −9.03 |
| 2816 | 768 | X | 512 | −1.25 | 256 | 0.00 | 0 | −6.02 |
| 3072 | 1024 | X | 768 | −2.04 | 512 | 0.00 | 256 | −4.26 |
| 3328 | 1280 | X | 1024 | −3.01 | 768 | 0.00 | 512 | −3.01 |
| 3584 | 1536 | X | 1280 | −4.26 | 1024 | 0.00 | 768 | −2.04 |
| 3840 | 1792 | X | 1536 | −6.02 | 1280 | 0.00 | 1024 | −1.25 |
| 4096 | 0 | X | 1792 | −9.03 | 1536 | 0.00 | 1280 | −0.58 |
| 4352 | 256 | X | 0 | X | 1792 | 0.00 | 1536 | 0.00 |
| 4608 | 512 | X | 256 | X | 0 | 0.00 | 1792 | 0.00 |

This example can be extended to L symbols.

Assume we have power estimates, pwr(i), and symbol timing offset estimates, delay(i) for each ranging code in symbol i where i=0 ... L−1. The problem to solve is to find the actual delay and power for the present ranging code.

Our proposal is to do the following. Find the OFDMA symbol with the largest power, pwr(imax). Assume that delay (imax) is a reliable delay estimate. Because the same ranging code is sent over two consecutive OFDMA symbols, the actual delay could be either imax*(N+cpLen)+delay(imax)

or imax*(N+cpLen)+delay(imax)−N

Figure 8:
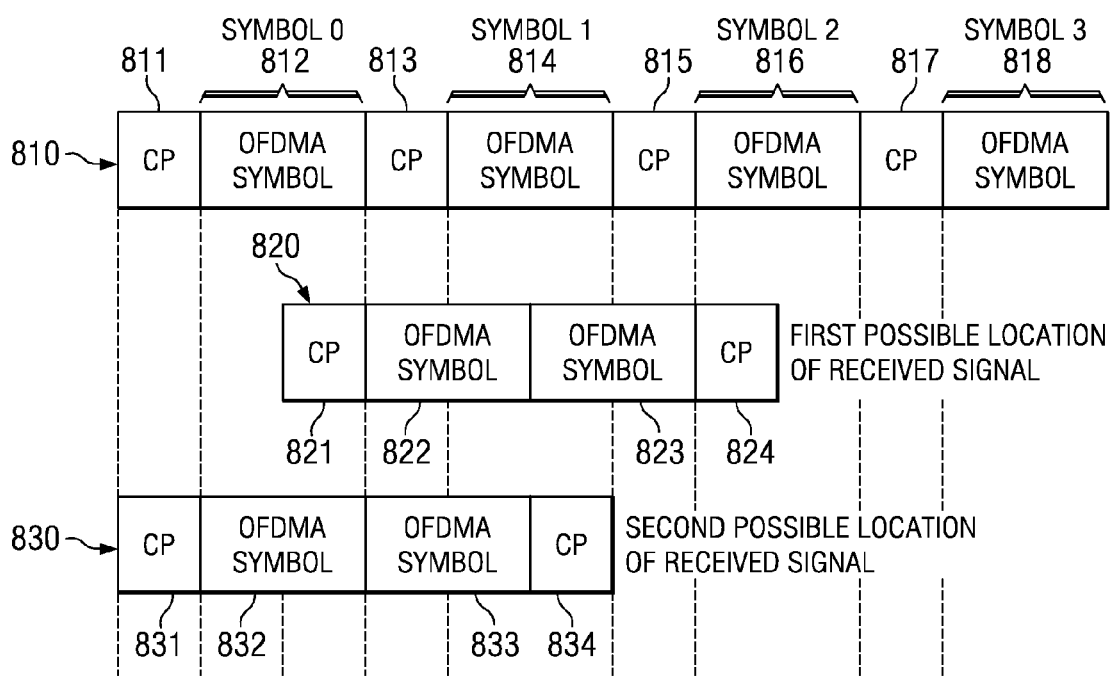
FIG. 8 is illustrative of two possible locations of the ranging transmission assuming that symbol 1 has the highest power level.

FIG. 8 is illustrative of two possible locations of the ranging transmission assuming that symbol 1 has the highest power level. For example, looking at FIG. 8, assume that the highest power is measured in symbol 1 and that delay(1) =cpLen. The two possible actual locations of the received ranging signal are shown. In the first case, the ranging signal overlaps symbol 0 by cpLen samples, overlaps symbol 1 completely (with N samples), and overlaps symbol 2 with N−cpLen samples. We can write this as overlap1=[cpLen, N, N−cpLen].

Similarly for the second possible location overlap2=[N, N, 0].

To find the most likely actual location, we take the weighted average of the estimated powers forming overlap1.* [pwr(0) pwr(1) pwr(2)]

and overlap2.* [pwr(0) pwr(1) pwr(2)]

whichever is larger, we assume is the actual location.

Figure 10:
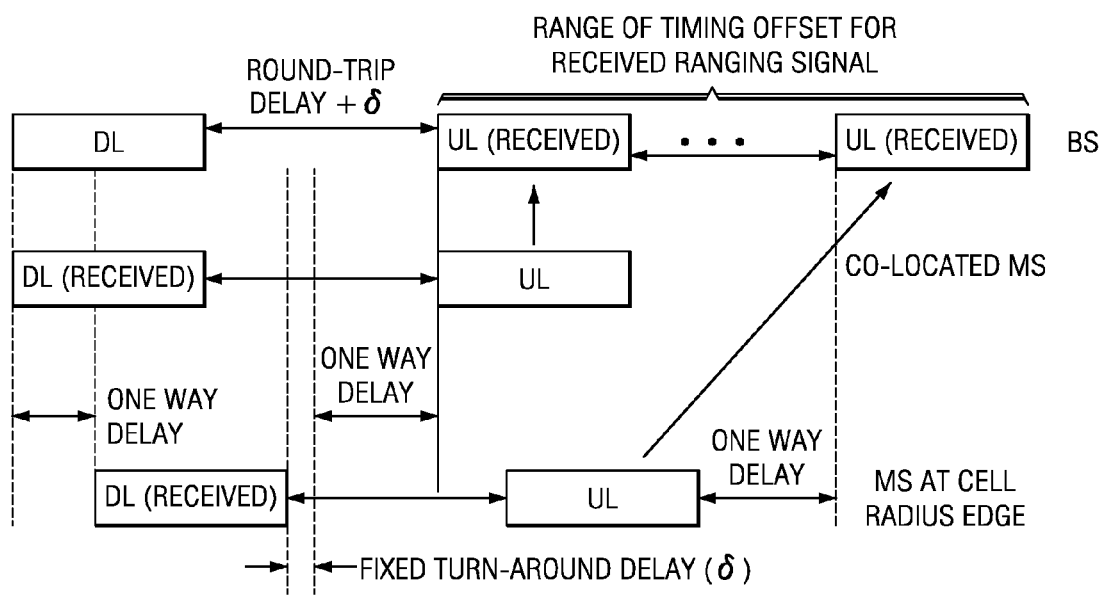
FIG. 10 is a diagram illustrative of the round trip delay suffered by signals in a communication system.

FIG. 10 is a diagram illustrative of the round trip delay suffered by signals in a communication system. Ranging adjusts each SS's timing offset such that it appears to be co-located with the BS. The SS may set its initial timing offset to the amount of internal fixed delay equivalent to co-locating the SS next to the BS. This amount includes delays introduced through a particular implementation and includes the downlink DL PHY interleaving latency, if any.

Initial timing offset of received ranging signal can vary by as much as the round trip delay and may be a multiple OFDMA symbols depending on radius. BS searches over entire time in which the ranging signal could be received. Guard time must be included in frame format to prevent collisions of ranging signal with normal data. The complexity increases as round trip delay (cell radius) increases.

FIG. 11A shows samples of interest for flowchart of FIG. 11 B. Showing that all symbols $X_0$ to $X_5$ are collected from three samples.

Figure 11B:
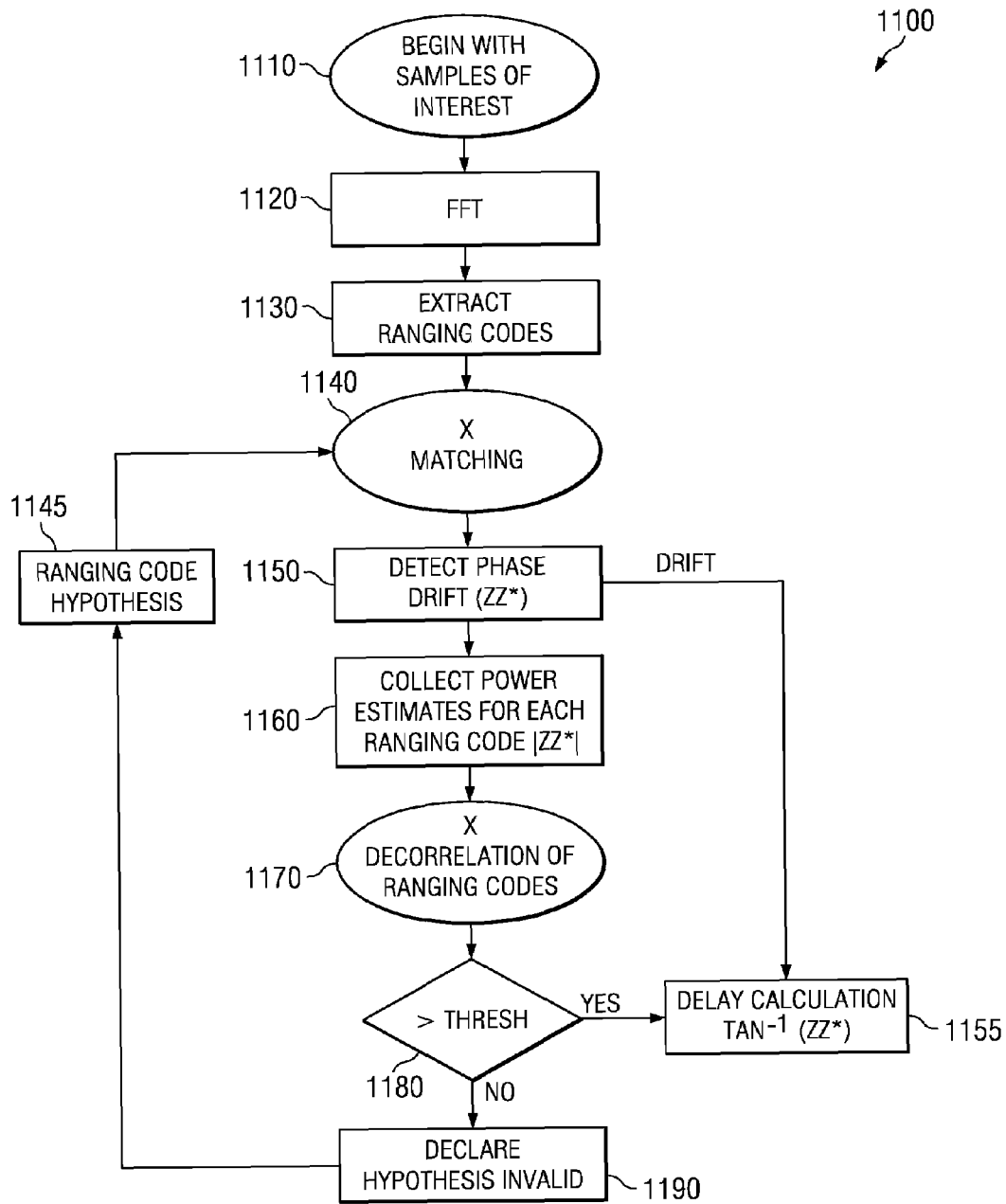
FIG. 11B is a flowchart in accordance with an embodiment of the invention.

FIG. 11B is a flowchart in accordance with an embodiment of the invention. Method 1100 begins 1110 by performing a Fast Fourier Transform (FFT) 1120 in normal time slots upon the samples of interest 1101. Sliding window or additional FFT results are not necessary and adds to complexity and lower performance. Upon performing FFT and getting a frequency-domain signal, the circular shift becomes phase drift. Ranging codes are extracted at 1130. A ranging code hypothesis 1145 is compared to the extracted codes. Phase drift is detected 1150 by averaging ZZ* across all tiles. A delay calculation is made by taking arctan of ZZ*. The power estimates for each ranging code are collected 1160. Decorrelation 1160 is done by multiplying the power for up to P codes by a matrix as described in above paragraphs. A determination if CDMA code is present is made, considering all possible time slots by determining if the power for a given code is above a threshold 1180. If CDMA code is present, the most likely actual timing offset is determined and delay calculation made.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for Orthogonal Frequency Division Multiplexing Access (OFDMA) ranging in a communication system, said method comprising:
   receiving, at a base station (BS), a signal having a plurality of OFDMA symbols;
   performing, at the BS, a Fast Fourier Transform (FFT) on said plurality of OFDMA symbols;
   extracting, at the BS, a plurality of ranging codes from the results of said FFT;
   finding, at the BS, ranging codes matching a ranging code hypothesis;
   calculating, at the BS, $Z_k Z^*_{k+1}$, where $Z_k = Y_k \times \hat{X}_k$, $\hat{X}_k$ is one of the ranging codes and $Y_k$ is the received signal, where k denotes subcarrier number and $Z_k Z^*_{k+1}$ is the product $Z_k$ and the complex conjugate of $Z_{k+1}$ where "*" means the complex conjugate;
   summing, at the BS, $Z_k Z^*_{k+1}$ values over all subcarriers k, for which subcarriers k and k+1 are both subcarriers used for ranging;
   estimating, at the BS, a transmit power by using the magnitude of said sum; and
   determining, at the BS, if the power for a given code is above a threshold.

2. The method of claim 1, wherein said threshold is set relative to noise measured in unused subchannels.

3. The method of claim 1, wherein multiple receive antennas and received signals are used and the sum is $$ZZ^* \text{ sum} = \frac{1}{M} \sum_{a=0}^{A-1} \sum_{i=0}^{L-1} \left[ \sum_{n=0}^{N-2} Z^a_{t_i+n} Z^{*a}_{t_i+n+1} \right]$$

where a denotes the antenna number, A is number of antennas, i is tile number index, L is number of tiles, $t_i$ denotes a first subcarrier of tile i, n is subcarrier index, N is number of subcarriers per tile and $ZZ^*$, is the product Z and the complex conjugate of Z where "*" means the complex conjugate and $M = A * L * (N-1)$.

4. The method of claim 1 further comprising: calculating, at the BS, the delay of said received signal.

* * * * *